UNITED STATES PATENT OFFICE.

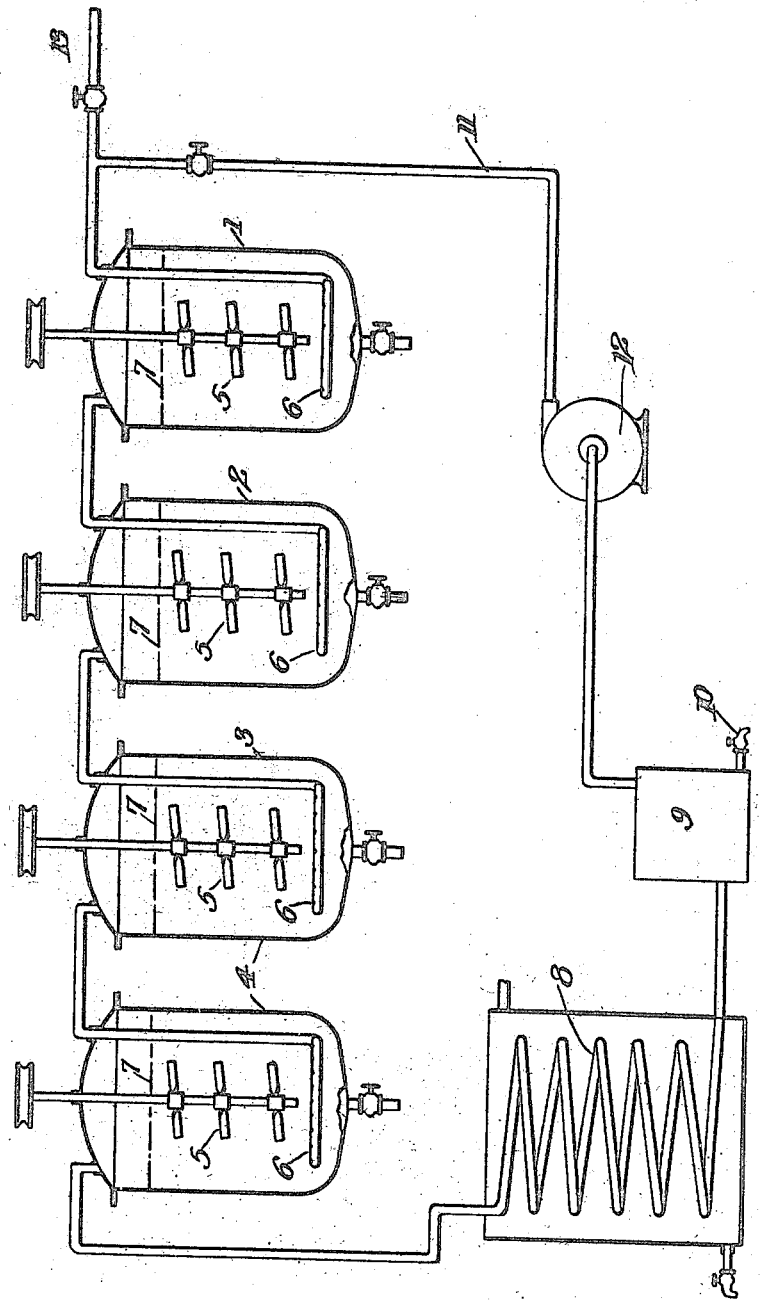

HAROLD HIBBERT, OF PITTSBURGH, PENNSYLVANIA, ASSIGNOR TO UNION CARBIDE COMPANY, OF NEW YORK, N. Y., A CORPORATION OF VIRGINIA.

METHOD OF PREPARING ACETALDEHYDE.

1,247,270.    Specification of Letters Patent.    Patented Nov. 20, 1917.

Application filed April 26, 1916. Serial No. 94,175.

*To all whom it may concern:*

Be it known that I, HAROLD HIBBERT, a subject of the King of Great Britain, residing at Pittsburgh, in the county of Allegheny and State of Pennsylvania, have invented certain new and useful Improvements in Methods of Preparing Acetaldehyde, of which the following is a specification.

This invention relates to methods of preparing acetaldehyde from acetylene. It is well known that acetylene may be caused to unite with the elements of water, yielding acetaldehyde, by bringing it into contact with a suitable compound of mercury in presence of solutions of sulfuric or equivalent strong acid. The present invention is an improvement upon processes of this general character, and has for its object the provision of an economical and highly efficient mode of operating.

According to the invention acetylene is led into an acid bath of the general character above mentioned, in material excess of the amount which can be absorbed in the first reaction. The bath is preferably maintained at a temperature of 70°—80° C., whereby the bulk of the acetaldehyde formed is continuously distilled off, mixed with the excess of acetylene. These mixed gases are conveyed directly to a second acid bath, preferably having the same characteristics as the first, where a further reaction takes place. If desired the commingled gases from this second bath, which by reason of the further reaction will contain a proportionately smaller amount of acetylene, may be conveyed to a third bath, and so on to any desired number of series-connected baths. Ultimately a sufficiently complete absorption of acetylene, for example an absorption in excess of 75 per cent. of the original volume, is secured. The exit gases from the final bath, consisting predominantly or substantially of acetaldehyde, are led to a condensing system, from which any residual acetylene may be returned to the first element of the absorption system, together with sufficient added acetylene to reestablish the desired excess. The rate of supply of acetylene to the system will depend upon several factors, including the number of vessels in series, the volume of the acid baths, and their conversion efficiency. Usually it is preferred to supply acetylene at such rate that some 50 per cent., more or less, of the gas entering the first absorption vessel will pass therefrom to the next in series.

The accompanying drawing illustrates in a diagrammatic manner one type of system suitable for the practice of this invention, the figure being a central longitudinal sectional view of a series of four reaction vessels. Each of these vessels, designated by numeral 1, 2, 3 and 4, is shown as provided with an agitator 5, and with a perforated coil 6 by which the inflowing gases are distributed beneath the liquid in the acid-bath 7. The mixed gases arising from each vessel pass directly through the bath in the vessel next in series, as described above, and from the final vessel 4 the gases are conveyed to any suitable condenser 8. The condensed acetaldehyde is withdrawn from the collecting vessel 9 through the tap 10, and any residual acetylene is returned to the system through conduit 11, by means of a pump 12 or equivalent device. Additional acetylene may flow into the system through the valved conduit 13.

As I have stated above the conversion of acetylene into acetaldehyde proceeds with a high degree of efficiency when a plurality of series-connected reaction vessels are employed, as distinguished from carrying out the reaction in a single body of liquid. Without restricting the invention by reference to any theoretical considerations, it may be pointed out as a possible explanation of the above observed fact, that the presence of acetaldehyde apparently increases to a material degree the solubility of acetylene, and its reactivity, in the acid solutions used. Hence one tendency of the series arrangement of the reaction vessels is to equalize the conditions throughout the system as follows: The pressure of acetylene, and therefore its solubility in the liquid in accordance with the law of partial pressure, is of course at a maximum in the first reaction vessel in series, and decreases throughout the system. On the other hand, the concentration of the acetaldehyde is at a minimum in the first reaction vessel and tends to increase throughout the series. The combined tendency of these two factors may be to equalize the reacting conditions throughout the system. Whatever may be the explanation of the results, the observed fact is that under such conditions as have been described above the reaction proceeds with rapidity and smoothness, and with but little tendency to the formation of by-products of reaction.

While my invention is not restricted to any particular constitution of bath for carrying out the reaction, satisfactory results are obtained using such acid baths as are disclosed in the copending applications of Hibbert and Morton, Serial Nos. 59,836, and 59,837, filed November 5, 1915.

I claim:—

1. A method of preparing acetaldehyde from acetylene, which consists in effecting a combination of acetylene with the elements of water in a suitable acid bath, and conveying vapors of acetaldehyde arising from said bath, commingled with acetylene, to one or more baths connected in series with and similar in composition to the first.

2. A method of preparing acetaldehyde from acetylene, which consists in effecting a combination of acetylene with the elements of water in an acid bath containing a mercury compound and maintained at a sufficient temperature for the continuous distillation of acetaldehyde, and conveying vapors of acetaldehyde arising from said bath, commingled with acetylene, to one or more baths connected in series with and similar in composition to the first.

In testimony whereof I affix my signature in presence of two witnesses.

HAROLD HIBBERT.

Witnesses:
HARVEY H. SMITH,
FRANK J. DAVIES.